United States Patent
Mastronarde et al.

(10) Patent No.: US 6,593,931 B1
(45) Date of Patent: Jul. 15, 2003

(54) METHOD AND APPARATUS FOR IMPROVING SYSTEM MEMORY BANDWIDTH UTILIZATION DURING GRAPHICS TRANSLATIONAL LOOKASIDE BUFFER CACHE MISS FETCH CYCLES

(75) Inventors: Josh B. Mastronarde, Sacremento, CA (US); Russell W. Dyer, El Dorado Hills, CA (US); Himanshu Sinha, Citrus Heights, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/452,540

(22) Filed: Dec. 1, 1999

(51) Int. Cl.$^7$ .............................................. G06F 13/18
(52) U.S. Cl. ...................... 345/535; 345/557; 345/568; 711/205; 711/206; 711/207
(58) Field of Search ................................. 345/568, 520, 345/531, 530, 535, 557, 564, 566, 552, 140; 711/200, 202, 203–205, 206, 169, 211, 207, 213, 118

(56) References Cited

U.S. PATENT DOCUMENTS 5,831,640 A * 11/1998 Wang et al. ................. 345/552
6,085,292 A * 7/2000 McCormack et al. ........ 711/140
6,192,455 B1 * 2/2001 Bogin et al. ................. 345/520
6,226,730 B1 * 5/2001 Murdoch et al. ............ 711/206
6,259,460 B1 * 7/2001 Gossett et al. ............... 345/552
6,327,645 B1 * 12/2001 Hsiao et al. ................. 711/140
6,370,633 B2 * 4/2002 Sethi ........................... 711/206

* cited by examiner

Primary Examiner—Kee M. Tung
(74) Attorney, Agent, or Firm—Calvin E. Wells

(57) ABSTRACT

An embodiment of a memory controller that improves main memory bandwidth utilization during graphics translational lookaside buffer fetch cycles is disclosed. The memory controller includes a first request path and a second request path. The memory controller further includes a graphics translational lookaside buffer that includes a cache. The graphics translational lookaside buffer issues an address fetch request to a memory interface when a graphics memory request received from the first request path or from the second request path misses the cache. The memory controller also includes a memory arbiter that includes a first request path cycle tracker and a second request path cycle tracker. The memory arbiter allows a request received from the second request path to be issued to the memory interface when a graphics memory request received from the first request path is stalled due to a graphics translational lookaside buffer cache miss.

17 Claims, 6 Drawing Sheets

METHOD AND APPARATUS FOR IMPROVING SYSTEM MEMORY BANDWIDTH UTILIZATION DURING GRAPHICS TRANSLATIONAL LOOKASIDE BUFFER CACHE MISS FETCH CYCLES

FIELD OF THE INVENTION

The present invention pertains to the field of computer systems. More particularly, this invention pertains to the field of improving system memory bandwidth utilization during graphics translational lookaside buffer cache miss fetch cycles.

BACKGROUND OF THE INVENTION

The main memory in many of today's computer systems includes a space used by the graphics subsystem. Typically, the computer system's processor and graphics controller have access to the graphics portion of main memory. A memory controller controls access to the main memory. The memory controller includes an arbiter that serves to arbitrate access to main memory. The memory controller also typically includes a graphics translational lookaside buffer (GTLB). Whenever an access to the graphics portion of main memory is requested by either the processor or the graphics controller, a translation must take place between the virtual address included in the access request and a corresponding physical address. This translation is typically handled by the GTLB.

The GTLB includes a cache that stores some of the most recently used physical addresses in the hope that future virtual addresses received as part of graphics memory access requests will correspond to physical addresses stored in the GTLB cache. Whenever a graphics memory access request misses the GTLB cache, or in other words the access request includes a virtual address that does not correspond to any of the physical address presently stored in the GTLB cache, the GTLB must fetch the appropriate physical address from a table located in main memory. Once the physical address is fetched and stored in the GTLB cache, the graphics memory access request can continue and is issued to a memory interface that handles the transaction with the main memory.

Today's main memories are typically capable of pipelined operation. That is, several main memory accesses may be pending at any given time. In prior memory controllers, whenever there is a GTLB cache miss, and therefore a GTLB fetch cycle, all main memory requests received after the access request that caused the GTLB fetch cycle are stalled until the fetch cycle is complete. This means that the high bandwidth main memory interface is left to handle a single fetch transaction, and the bandwidth normally available when using pipelined transactions is wasted. As main memory interfaces become more and more sophisticated and capable of sustaining greater bandwidth, the penalties associated with stalling the main memory interface for a GTLB fetch cycle will increase.

SUMMARY OF THE INVENTION

A method and apparatus for improving main memory bandwidth utilization during graphics translational lookaside buffer fetch cycles is disclosed. The apparatus includes a first request path and a second request path. The apparatus further includes a graphics translational lookaside buffer that includes a cache. The graphics translational lookaside buffer issues an address fetch request to a memory interface when a graphics memory request received from the first request path or from the second request path misses the cache. The apparatus also includes a memory arbiter that includes a first request path cycle tracker and a second request path cycle tracker. The memory arbiter allows a request received from the second request path to be issued to the memory interface when a graphics memory request received from the first request path is stalled due to a graphics translational lookaside buffer cache miss.

BRIEF DESCRIPTION OF THE DRAWINGS

The invention is illustrated by way of example and not limitation in the figures of the accompanying drawings, in which like references indicate similar elements, and in which.

DETAILED DESCRIPTION

Embodiments of a memory controller that improves main memory bandwidth utilization during graphics translational lookaside buffer (GTLB) fetch cycles are disclosed. The memory controller includes an arbiter that uses separate cycle trackers for requests received over different request paths. The memory controller allows main memory requests that are received during a GTLB fetch cycle to issue to main memory while the GTLB fetch cycle is pending.

Figure 1:
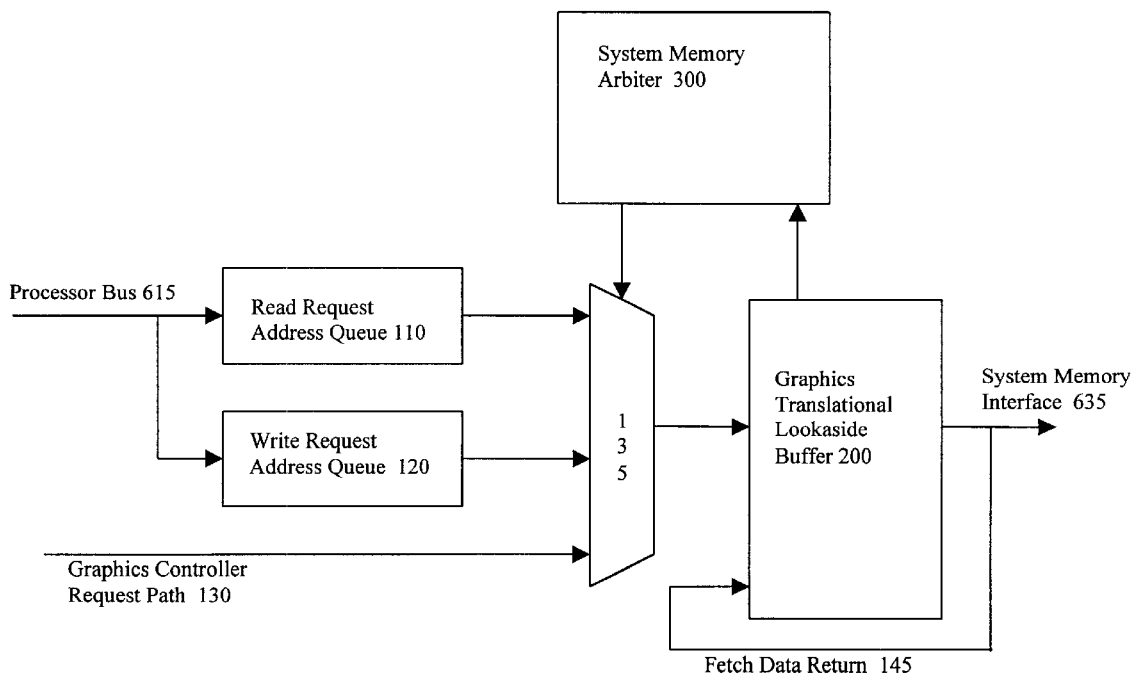
FIG. 1 is a block diagram of one embodiment of a memory controller that includes a memory arbiter and a graphics translational lookaside buffer which improve main memory bandwidth utilization by allowing main memory requests to issue while a graphics translational lookaside buffer fetch cycle is pending.

FIG. 1 is a block diagram of one embodiment of a memory controller 100 that includes a system memory arbiter 300 and a GTLB 200 which improve main memory bandwidth utilization by allowing main memory requests to issue to a system memory interface 635 while a GTLB fetch cycle is pending. System memory transaction requests are received from a processor bus 615 via a read request address queue 110 and a write request address queue 120. System memory transaction requests are also received by a graphics controller (not shown) over a bus such as an Advanced Graphics Port (AGP) bus (not shown) and from the AGP bus to a graphics controller request path 130. The request paths 110, 120, and 130 are received by a multiplexor circuit 135. The multiplexor circuit 135 delivers one of the requests received over request paths 110, 120, and 130 to the GTLB 200. The multiplexor circuit 135 is controlled by the system memory arbiter 300. The GTLB issues cycles to a system memory interface 635 (not shown). GTLB fetch cycle return data is received over a fetch data return path 145.

Figure 2:
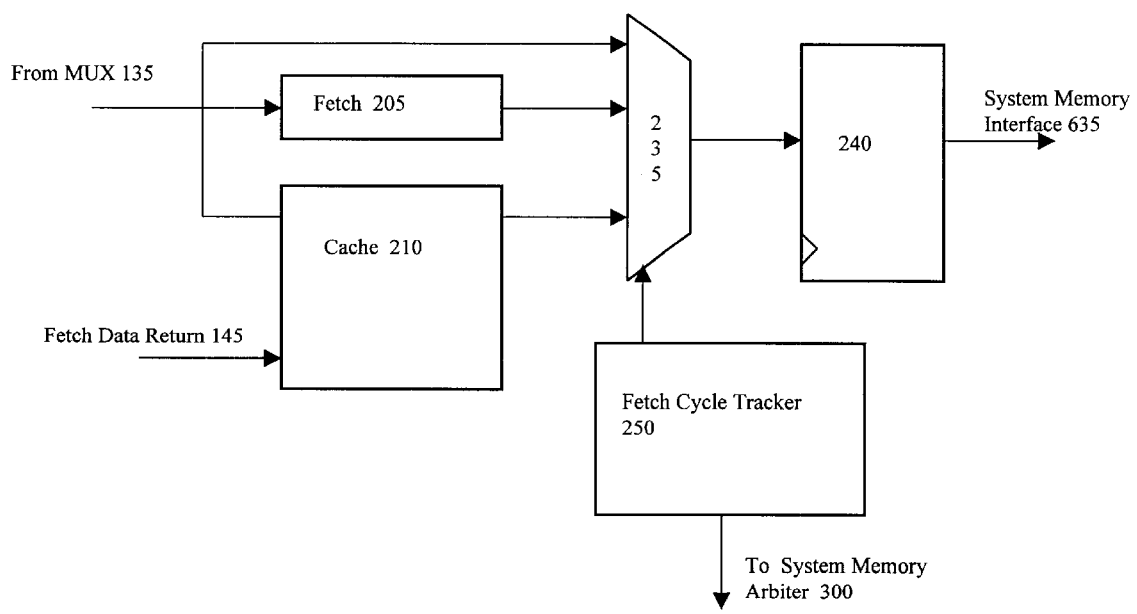
FIG. 2 is a block diagram of an embodiment of a graphics translational lookaside buffer that exchanges cycle tracking information with a memory arbiter.

FIG. 2 is a more detailed look at one embodiment of the GTLB 200. Memory transaction requests received from multiplexor 135 are, in general, requests for access to either non-graphics space in main system memory or are requests to graphics space in main system memory. Requests that are for access to non-graphics space pass from the multiplexor 135 to another multiplexor 235. Requests that are for access to graphics space are referred to a cache 210 where a lookup is performed. The cache 210 stores physical addresses corresponding to some of the most recent virtual addresses received as part of graphics memory transaction requests. If there is a cache hit, the request is forwarded along with the appropriate physical address to the multiplexor 235. In the event of a cache miss, a fetch unit 205 and fetch cycle tracker 250 perform a fetch cycle to main system memory which has stored therein a table of physical addresses. The appropriate physical address is returned to the cache 210 via the fetch data return path 145. Once the appropriate physical address is returned, the graphics memory request is forwarded to the multiplexor 235. The multiplexor receives input from the fetch cycle tracker 250 and the fetch cycle tracker 250 exchanges information with the system memory arbiter 300. The multiplexor 235 delivers requests from the appropriate paths to a flip-flop 240. The requests are then delivered to the system memory interface 635.

Figure 3:
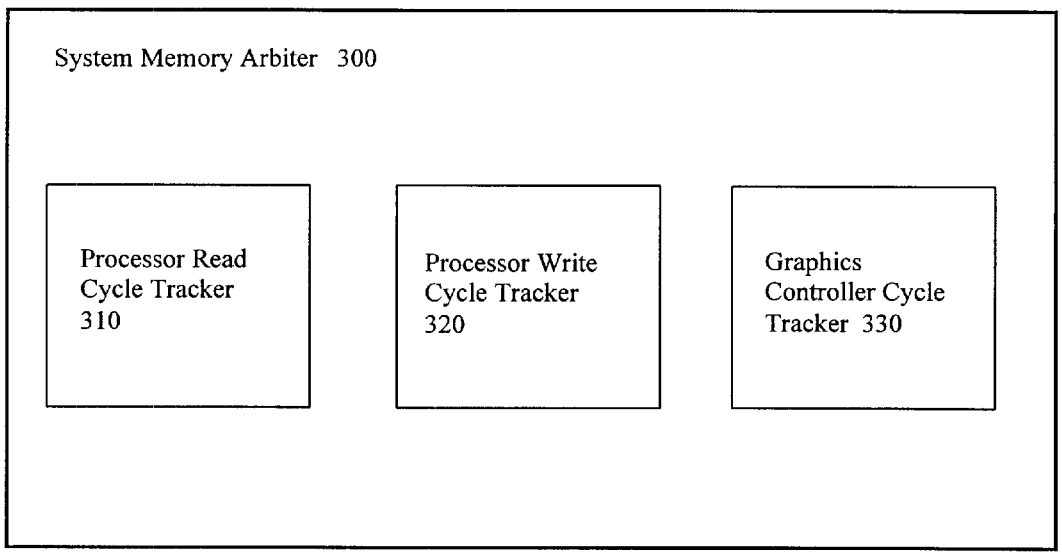
FIG. 3 is a block diagram of an embodiment of a memory arbiter that includes separate cycle trackers for processor read, processor write, and graphics controller requests.

FIG. 3 is a block diagram of an embodiment of a memory arbiter that includes separate cycle trackers for processor read, processor write, and graphics controller requests. Using separate cycle trackers for each of the request paths allows the system memory arbiter 300 to issue a memory access request even when one of the cycle trackers 310, 320, or 330 is stalled due to a GTLB fetch cycle. Although the present embodiment utilizes three cycle trackers for three request paths, other embodiments are possible that include different numbers of request paths and cycle trackers, so long as more than one cycle tracker is included. For example, an alternative embodiment may include 4 cycle trackers for 4 request paths.

Figure 4:
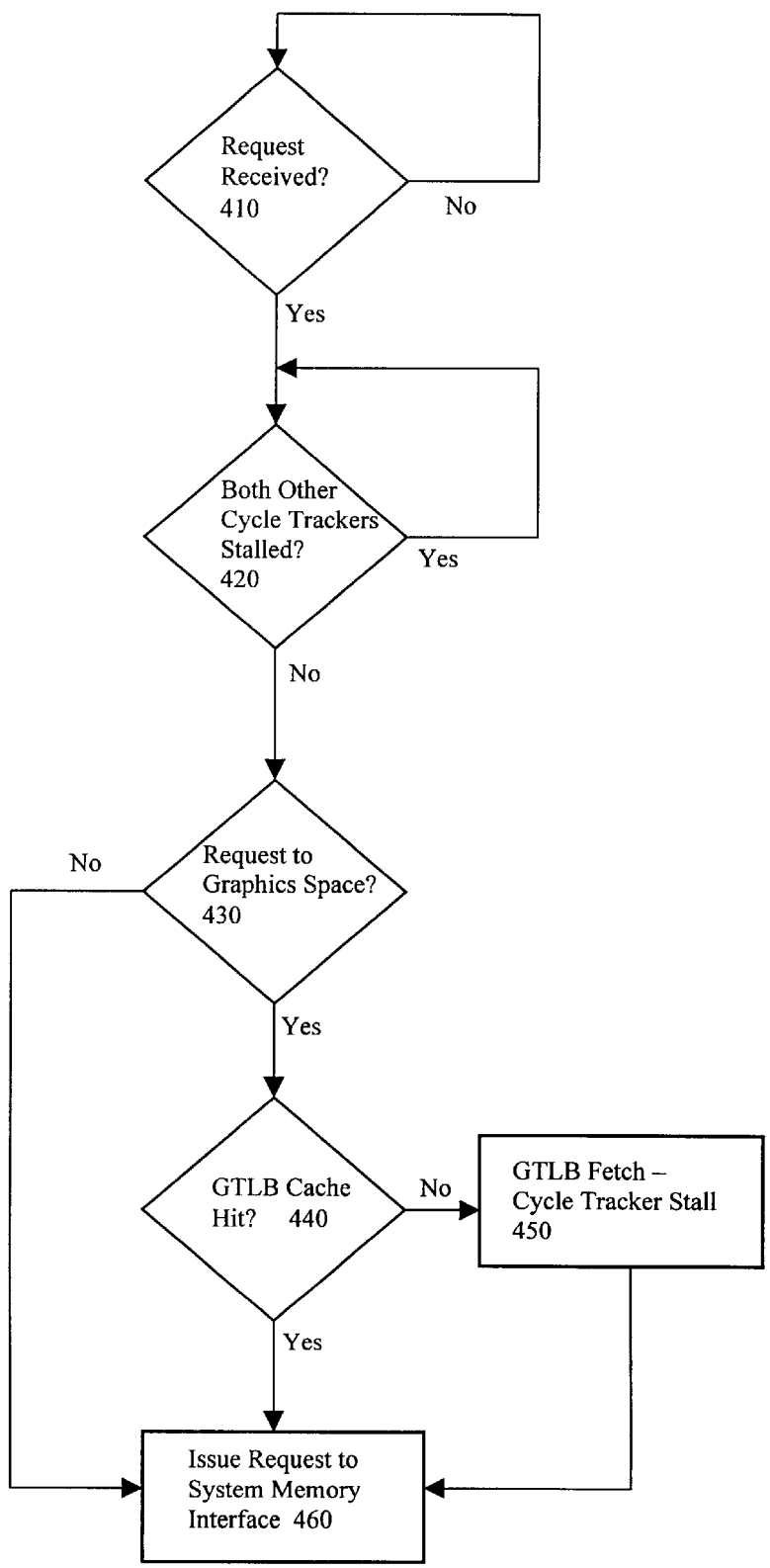
FIG. 4 is a flow diagram depicting the logical operation of one embodiment of a cycle tracker included as part of the memory arbiter.

FIG. 4 is a flow diagram depicting the logical operation of one embodiment of a cycle tracker included as part of the memory arbiter 300. For this embodiment, the diagram applies to each of the cycle trackers 310, 320, and 330. As shown at block 410, the first step is to wait to receive a memory transaction request. The request may be received as a read or write request from a processor or may be a request from a graphics controller. Requests from other sources are possible, including requests from other peripheral devices. Once a request is received, a decision is made at block 420 as to whether the other two cycle trackers are stalled due to GTLB fetch cycles. If none or only one of the other cycle trackers is stalled due to a GTLB fetch cycle, the process moves to block 430. If both other cycle trackers are stalled due to GTLB fetch cycles, then block 420 is repeated until at least one of the other cycle trackers leaves its stalled state. Although the present embodiment does not allow a request to issue while two other previous requests are stalled due to GTLB fetch cycles, other embodiments are possible that allow a request to issue when any number of previous requests are stalled due to GTLB fetch cycles.

As shown at block 430, if the request is to non-graphics space in main system memory, the request is issued to a system memory interface at block 460. If the request is to graphics space, a determination is made at block 440 as to whether the virtual address included as part of the request to graphics space has a corresponding physical address stored in the GTLB cache (a cache hit). If the appropriate physical address is not currently stored in the GTLB cache (a cache miss), a GTLB fetch cycle is performed at block 450. The cycle tracker is stalled until the fetch cycle is complete at which time the request is issued to the system memory interface at block 460. If a cache hit occurs at block 440, there is no need for a GTLB fetch cycle and the request is issued to the system memory interface at block 460.

Figure 5:
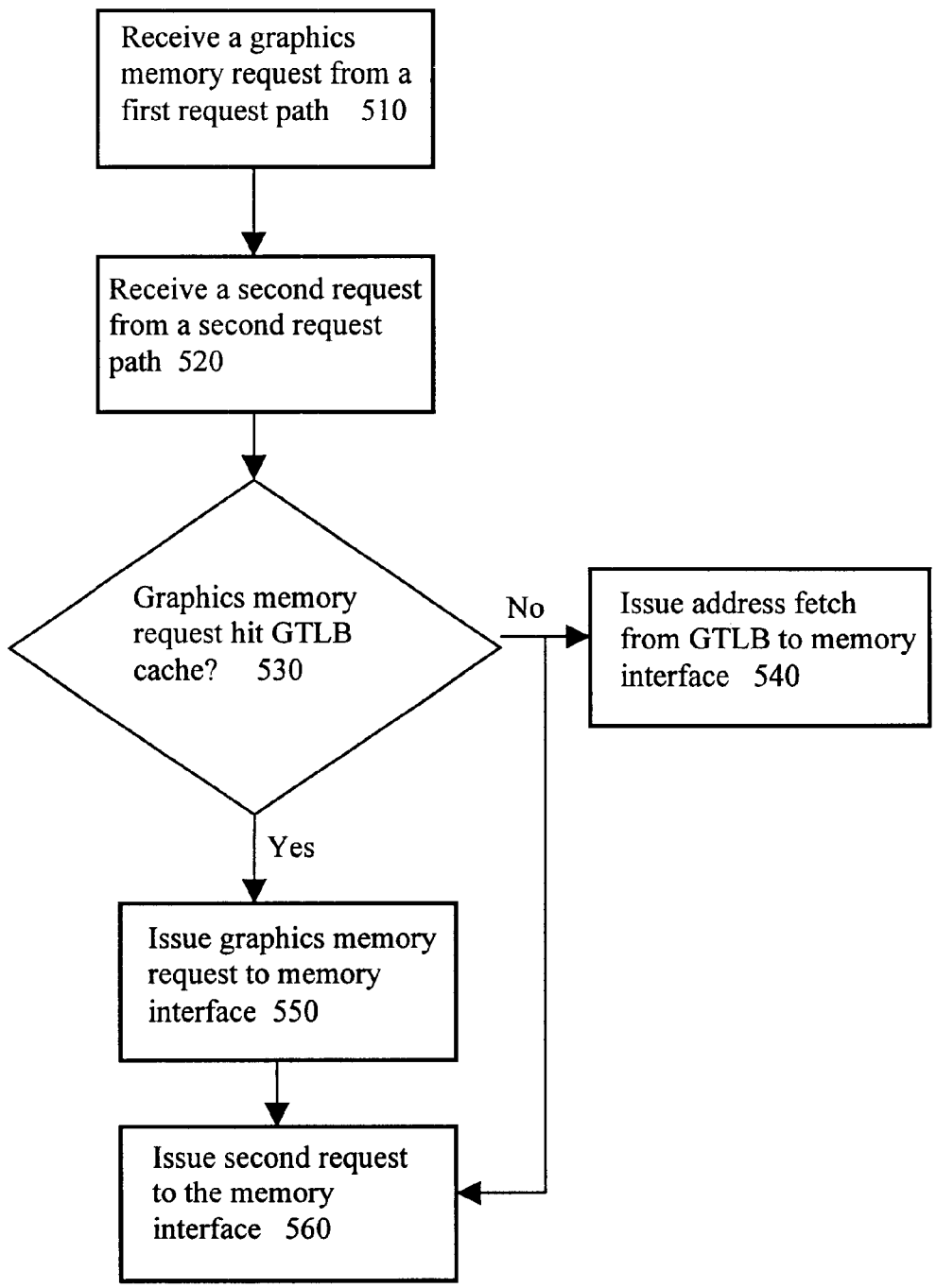
FIG. 5 is a flow diagram of one embodiment of a method for improving main memory bandwidth utilization by allowing main memory requests to issue to a memory interface while a graphics translational lookaside buffer fetch cycle is pending.

FIG. 5 is a flow diagram of one embodiment of a method for improving main memory bandwidth utilization by allowing main memory requests to issue to a memory interface while a graphics translational lookaside buffer fetch cycle is pending. At step 510, a graphics memory request is received from a first request path. The graphics memory request may be received from a graphics controller located on an AGP bus. A second request is received from a second request path at step 520. The second request may be received from a processor or from a peripheral device. As shown at step 530, if the graphics memory request results in a GTLB cache hit, the graphics memory request is issued to a system main memory interface at step 550. If the graphics memory request results in a GTLB cache miss, then a GTLB fetch cycle is issued at step 540. Following either step 550 or 560, the second request is issued to the system main memory interface at step 560. Note that even in the event of GTLB cache miss for the graphics memory request, which results in the issuance of a GTLB fetch cycle, the second request is allowed to issue while the GTLB fetch cycle is pending.

Figure 6:
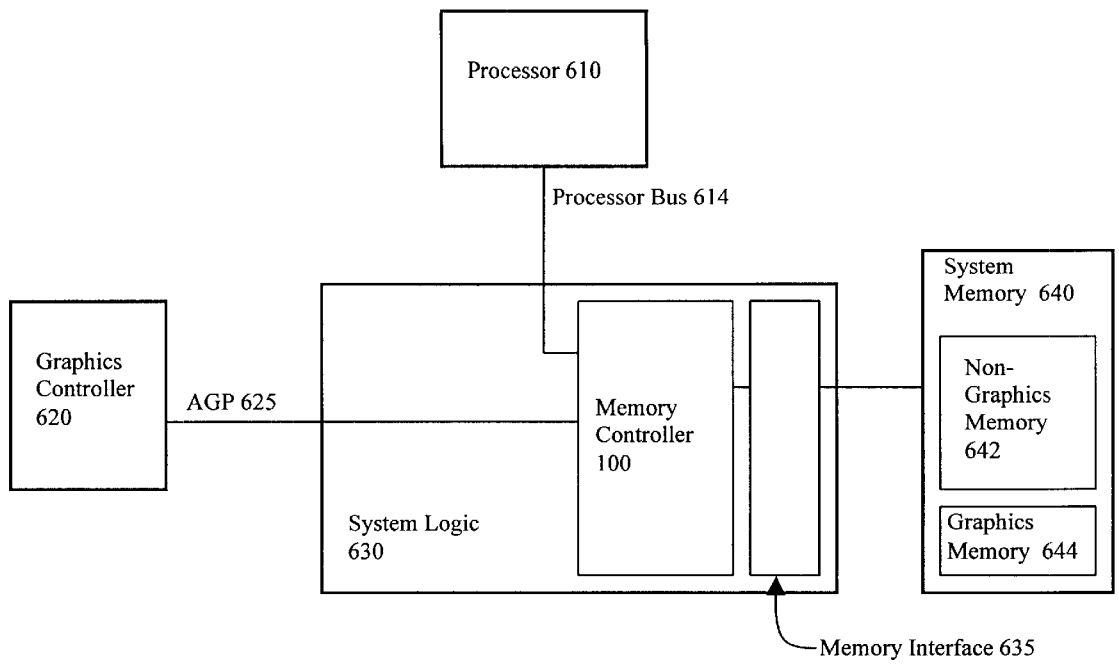
FIG. 6 is a block diagram of one embodiment of a system including the memory controller of FIG. 1.

FIG. 6 is a block diagram of one embodiment of a system including the memory controller 100 of FIG. 1. The memory controller 100 is included in a system logic device 630. The memory controller 100 receives memory access requests from a processor 610 and a graphics controller 620. Requests from the graphics controller 620 are received over an AGP bus 625. The memory controller 100 performs memory arbitration, cycle tracking, and GTLB functions as described above in connection with FIGS. 1 through 5. The memory controller 100 issues memory requests to a memory interface 635. The memory interface 635 communicates with a system memory 640. The system memory 640 includes a graphics memory space 644 and a non-graphics memory space 642. The graphics memory space 644 may be used to store textures or other data for use by the graphics controller 620. The non-graphics memory space 642 may be used to store an operating system and other applications and data. The system memory 640 may be implemented using synchronous dynamic random access memory (SDRAM) or other memory types that support pipelined operation, such as RAMBUS memory (RAMBUS is a trademark of Rambus, Inc.).

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
   a first request path;
   a second request path;
   a graphics translational lookaside buffer including a cache, the graphics translational lookaside buffer to issue an address fetch request to a memory interface when a graphics memory request received from the first request path or the second request path misses the cache; and a memory arbiter including a first request path cycle tracker and a second request path cycle tracker, the memory arbiter to allow a request received from the second request path to be issued to the memory interface when a graphics memory request received from the first request path is stalled due to a graphics translational lookaside buffer cache miss.

2. The apparatus of claim 1 wherein the request received from the second request path is a non-graphics memory request.

3. The apparatus of claim 1 wherein the request received from the second request path is a graphics memory request that results in a graphics translational lookaside buffer cache hit.

4. The apparatus of claim 1 further comprising a third request path and the memory arbiter further including a third request path cycle tracker.

5. The apparatus of claim 4, the memory arbiter to allow a request received from the third request path to be issued to the memory interface when the graphics memory request received from the first request path is stalled due to a graphics translational lookaside buffer cache miss and the request received from the second request path has already been issued to the memory interface where the requests from the first and second request paths are received before the request received from the third request path.

6. The apparatus of claim 5 wherein the first request path is a processor read request path, the second request path is a graphics controller request path, and the third request path is a processor write request path.

7. The apparatus of claim 4, the memory controller to stall a request received from the third request path when the graphics memory request received from the first request path and the request received from the second request path result in graphics translational lookaside buffer cache misses where the requests received from the first and second request paths are received before the request received from the third request path.

8. The apparatus of claim 7 wherein the first request path is a processor read request path, the second request path is a graphics controller request path, and the third request path is a processor write request path.

9. A method, comprising:

receiving a graphics memory request from a first request path;

receiving a second request from a second request path;

issuing an address fetch from a graphics translational lookaside buffer including a cache to a memory interface when the graphics memory request received from the first request path misses the cache; and issuing the second request to the memory interface while the graphics memory request is stalled due to the cache miss.

10. The method of claim 9 wherein the step of receiving a second request from a second request path includes the step of receiving a non-graphics memory request.

11. The method of claim 9 wherein the step of receiving a second request from a second request path includes the step of receiving a graphics memory request that results in a graphics translational lookaside buffer cache hit.

12. The method of claim 9 further comprising receiving a third request from a third request path.

13. The method of claim 12 further comprising issuing the third request received from the third request path to the memory interface when the graphics memory request received from the first request path is stalled due to a graphics translational lookaside buffer cache miss and the request received from the second request path has already been issued to the memory interface where the requests from the first and second request paths are received before the request received from the third request path.

14. The method of claim 13 wherein the step of receiving the graphics memory request from the first request path includes the step of receiving is a graphics memory read request from a processor, the step of receiving the second request from the second request path includes receiving a request from a graphics controller, and the step of receiving a third request from a third request path includes receiving a write request from a processor.

15. The method of claim 12 further comprising stalling the third request received from the third request path when the graphics memory request received from the first request path and the request received from the second request path result in graphics translational lookaside buffer cache misses where the requests received from the first and second request paths are received before the request received from the third request path.

16. The method of claim 15 wherein the step of receiving the graphics memory request from the first request path includes the step of receiving is a graphics memory read request from a processor, the step of receiving the second request from the second request path includes receiving a request from a graphics controller, and the step of receiving a third request from a third request path includes receiving a write request from a processor.

17. A computer system, comprising:

a processor;

a graphics controller;

a system memory; and a memory controller coupled to the processor, the graphics controller, and the system memory, the memory controller including a first request path to receive read requests from the processor, a second request path to receive requests from the graphics controller, a third request path to receive write requests from the processor, a graphics translational lookaside buffer including a cache, the translational lookaside buffer to issue an address fetch request to the system memory when a graphics memory request received from the first, second, or third request paths misses the cache, and a memory arbiter including a first request path cycle tracker, a second request path cycle tracker, and a third request path cycle tracker, the memory arbiter to allow a request received from the second request path to be issued to the system memory when a graphics memory request received from the first request path is stalled due to a graphics translational lookaside buffer cache miss.

* * * * *

UNITED STATES PATENT AND TRADEMARK OFFICE
CERTIFICATE OF CORRECTION

PATENT NO. : 6,593,931 B1
DATED : July 15, 2003
INVENTOR(S) : Mastronarde et al.

It is certified that error appears in the above-identified patent and that said Letters Patent is hereby corrected as shown below:

Column 6,
Line 35, delete "Acomputer" and insert -- A computer --.

Signed and Sealed this

Second Day of December, 2003

JAMES E. ROGAN
*Director of the United States Patent and Trademark Office*